United States Patent
Ryu et al.

(10) Patent No.: US 8,077,864 B2
(45) Date of Patent: Dec. 13, 2011

(54) APPARATUS FOR COMPUTING STREAMCIPHER TSC-4

(75) Inventors: Gwan Ho Ryu, Daejeon (KR); Dong Wook Lee, Daejeon (KR); Bon Seok Koo, Daejeon (KR); Tae Joo Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 589 days.

(21) Appl. No.: 12/269,954

(22) Filed: Nov. 13, 2008

(65) Prior Publication Data

US 2009/0147946 A1    Jun. 11, 2009

(30) Foreign Application Priority Data

Dec. 6, 2007    (KR) .......................... 10-2007-0126226

(51) Int. Cl.
*H04L 9/28*    (2006.01)

(52) U.S. Cl. ........................................... 380/28; 380/42

(58) Field of Classification Search .................... 380/28, 380/42
See application file for complete search history.

(56) References Cited

U.S. PATENT DOCUMENTS

| 5,727,062 A | * | 3/1998 | Ritter | ............................... 380/37 |
| 7,505,588 B2 | * | 3/2009 | Mironov et al. | ................ 380/42 |
| 2010/0128870 A1 | * | 5/2010 | Tsunoo et al. | ................... 380/46 |

FOREIGN PATENT DOCUMENTS

| KR | 10-0226867 B1 | 7/1999 |
| KR | 1020070109154 A | 11/2007 |

OTHER PUBLICATIONS

Information Society Technologies; "SASC 2006 Stream Ciphers Revisited Workshop Record", Leuven, Belgium, Feb. 2-3, 2006, ECRYPT Network of Excellence in Cryptology.

* cited by examiner

*Primary Examiner* — Krisna Lim
(74) *Attorney, Agent, or Firm* — Ladas & Parry LLP

(57) ABSTRACT

Provided is an apparatus for computing a T-function based Stream Cipher (TSC)-4 stream cipher. The apparatus includes: two T-function units; and a nonlinear filter for receiving bits output from the two T-function units and generating an 8-bit output sequence per clock. Each of the T-function units includes: a first register for storing an internal state value of the lower N bits; an N-bit internal state updater for updating the internal state value of the lower N-bits stored in the first register; an intermediate result register for storing an intermediate result value output from the N-bit internal state updater; a second register for storing an internal state value of the upper M bits; and an M-bit internal state updater for updating the internal state value of the upper M bits stored in the second register using the value stored in the intermediate result register.

6 Claims, 4 Drawing Sheets

APPARATUS FOR COMPUTING STREAMCIPHER TSC-4

CROSS-REFERENCE TO RELATED APPLICATION

This application claims priority to and the benefit of Korean Patent Application No. 2007-126226, filed Dec. 6, 2007, the disclosure of which is incorporated herein by reference in its entirety.

BACKGROUND

1. Field of the Invention

The present invention relates to an apparatus for computing a T-function based Stream Cipher (TSC)-4, and more particularly, to a hardware-based computation apparatus using a TSC-4 algorithm for reduction in hardware weight and high-speed computation.

2. Discussion of Related Art

A TSC-4 algorithm, which was proposed by the eSTREAM project under management of the European Network of Excellence for Cryptology (ECRYPT) as a European standard stream cipher, was adopted as a standard algorithm of the Telecommunication Technology Association by the Korean Telecommunication Technology Association in December 2006.

The TSC-4 algorithm treats a plaintext as a bit stream to encrypt it by 8 bits (or 1 byte) at a time.

Conventional stream ciphers mainly use a Linear Feedback Shift Register (LFSR). The TSC-4 algorithm, however, can be implemented in a smaller size than the LFSR, using a new calculation method called T-function, and is also suitable to be implemented in software due to its 32-bit structure.

It has not been long since the above-described TSC-4 algorithm was adopted as the standard algorithm of Telecommunication Technology Association. Thus, although research on the TSC-4 algorithm is not actively in progress, in reference to a conventional hardware-based cipher implementation process, it is predicted that the TSC-4 algorithm will be implemented for high speed and light weight.

SUMMARY OF THE INVENTION

The present invention is directed to providing a T-function based Stream Cipher (TSC)-4 computation apparatus capable of performing a TSC-4 algorithm at high speed.

The present invention is also directed to providing a TSC-4 computation apparatus capable of implementing a TSC-4 algorithm in small-sized hardware.

One aspect of the present invention provides an apparatus for computing a TSC-4 stream cipher comprising: two T-function units; and a nonlinear filter for receiving bits output from the two T-function units and generating an 8-bit output sequence per clock. Here, each of the T-function units comprises: a first register for storing internal state values of lower N bits; an N-bit internal state updater for updating the internal state values of the lower N bits stored in the first register; an intermediate result register for storing an intermediate result output from the N-bit internal state updater; a second register for storing internal state values of upper M bits; and an M-bit internal state updater for updating the internal state values of the upper M bits stored in the second register using the intermediate result stored in the intermediate result register.

Another aspect of the present invention provides an apparatus for computing a TSC-4 stream cipher comprising: a T-function unit and a nonlinear filter for receiving bits output from the T-function unit and generating an 8-bit output sequence per clock. Here, the T-function unit comprises: a shift register for storing current internal state values of the T-function, and outputting a 4-bit LSB value of the current internal state at every clock; two S-box operators each for generating 4-bit data for updating 4-bit MSB value of the shift register using the 4-bit LSB value of the current internal state output from the shift register; a multiplexer for selecting one of the two 4-bit data output from the two S-box operators for updating the 4-bit MSB value of the shift register; and a 1-bit parameter generator for generating a parameter required for the selection of the multiplexer by one bit using the 4-bit LSB value of the current internal state output from the shift register.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
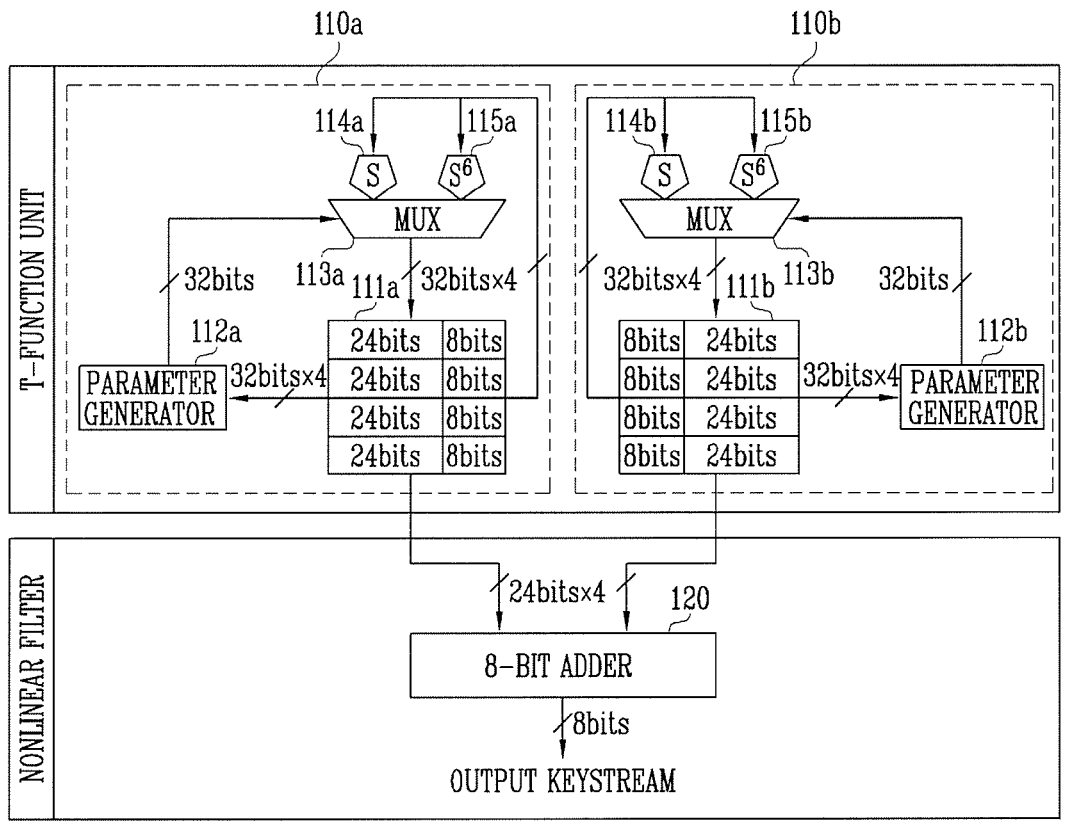
FIG. 1 is a basic block diagram of a T-function based Stream Cipher (TSC)-4 computation apparatus implementing a TSC-4 algorithm.

FIG. 1 is a basic block diagram of a TSC-4 computation apparatus implementing the TSC-4 algorithm. The TSC-4 computation apparatus includes two T-function units $110a$ and $110b$ and a non-linear filter comprised of 8-bit adder $120$. The two T-function units $110a$ and $110b$ set internal states of T-functions using 256 bits, i.e., 8 words $\chi_0, \chi_1, \chi_2, \chi_3, y_0, y_1, y_2$ and $y_3$, generated after state initialization using an 80-bit key and an 80-bit initial value. The 8-bit adder $120$ receives 96 bits output from the two T-function units $110a$ and $110b$ and generates an 8-bit output sequence per clock.

Each T-function unit $110a/110b$ includes a 128-bit internal state storing register $111a/111b$, a 32-bit parameter generator $112a/112b$, S-box operators $114a$ and $115a/114b$ and $115b$ and a multiplexer $113a/113b$ for selecting one of the two S-box operators. The T-function unit $110a/110b$ sets the internal state of the T-function using 4 words $\chi_0, \chi_1, \chi_2, \chi_3/y_0, y_1, y_2, y_3$ and updates the internal state using a parameter $p_1(x)/p_2(y)$ generated by the parameter generator $112a/112b$.

Figure 2:
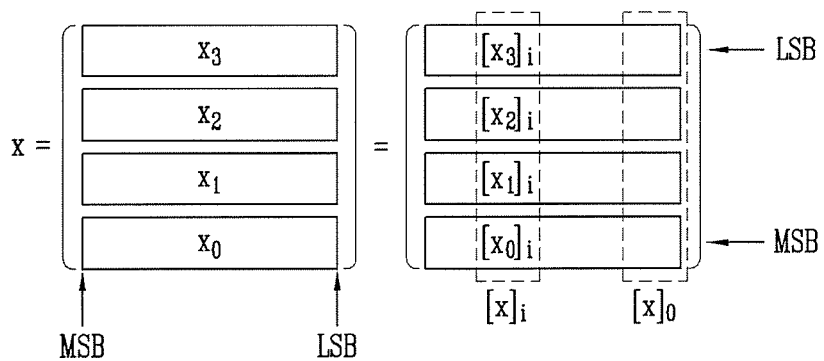
FIG. 2 illustrates an internal state of T-function.

FIG. 2 illustrates an internal state of T-function. The internal state of T-function is represented by 4 words $\chi_0, \chi_1, \chi_2, \chi_3$. As illustrated, using i-th bits (i=0, ..., 31) of 4 words $\chi_0, \chi_1$, $\chi_2$, $\chi_3$, an integer $[x]_i$, i.e., an i-th bit of a word x, between 0 and 15 is generated according to the following equation:

$$[x]_i=[\chi_3]_i 2^3+[\chi_2]_i 2^2+[\chi_1]_i 2^1+[\chi_0]_i 2^0 \ (i=0,\ldots,31). \quad \text{[Equation 1]}$$

$[x]_i$ is updated with an integer obtained by applying an i-th bit of the parameter $p_1(x)$ to an S-box and developed in a binary scale to update i-th bits of the respective words. The above-described process is performed with i varying between 0 and 31 to update all internal states of the T-function.

Figure 3:
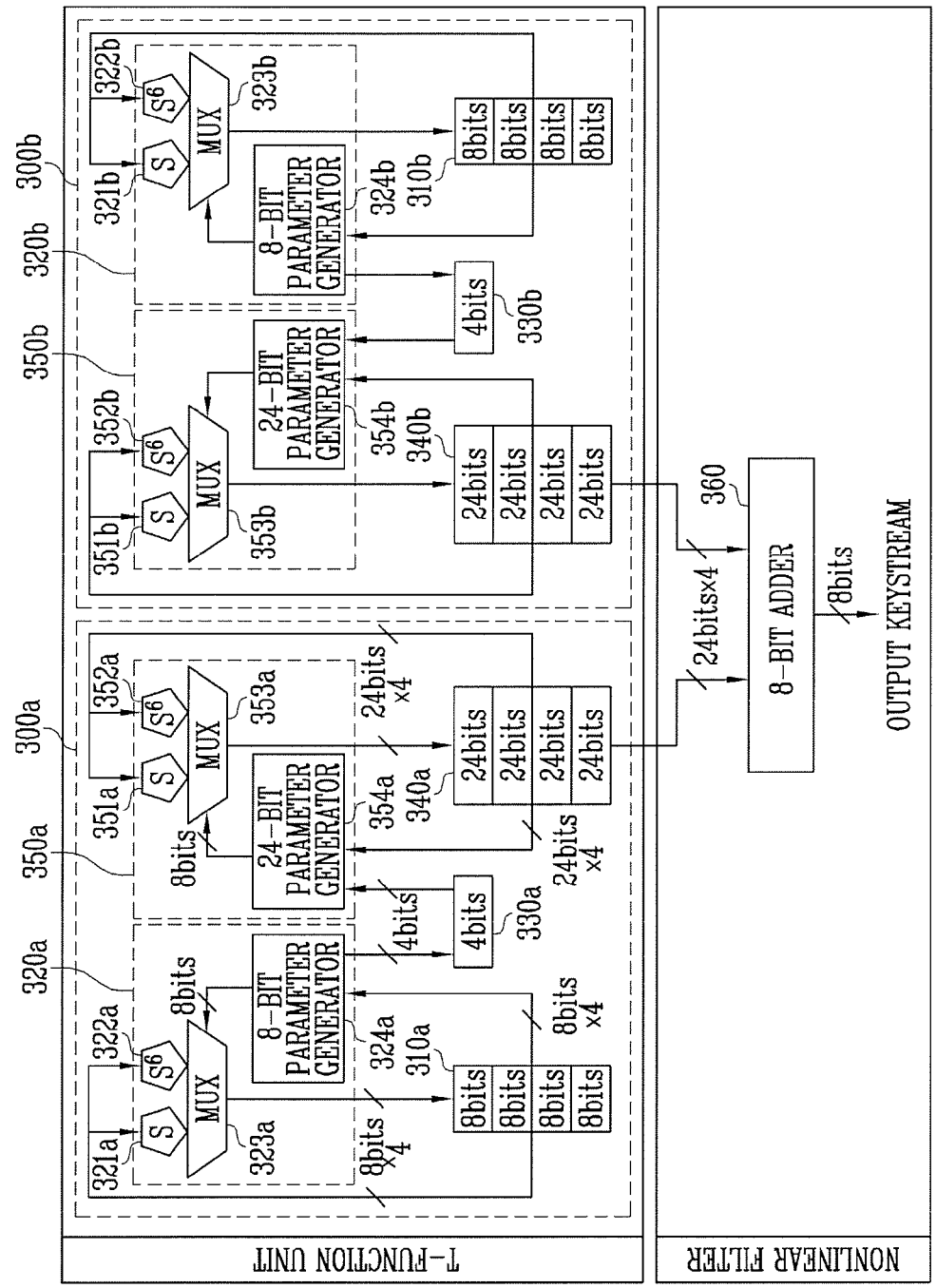
FIG. 3 is a block diagram of an apparatus for computing a TSC-4 at high speed according to a first exemplary embodiment of the present invention.

FIG. 3 is a block diagram of an apparatus for computing a T-function based Stream Cipher (TSC)-4 at high speed according to a first exemplary embodiment of the present invention. As illustrated, the computation apparatus includes two T-function units 300a and 300b and a nonlinear filter comprised of an 8-bit adder 360, which is similar to the structure shown in FIG. 1. However, the computation apparatus according to the first embodiment is different from that of FIG. 1 in that it updates the internal state of T-function unit by first updating lower 8-bit internal state values and then updating upper 24-bit internal state values using an intermediate result obtained from the first update process.

Each T-function unit 300a/300b includes a 32-bit internal state storing register 310a/310b for storing the internal state values of the lower 8 bits; an 8-bit internal state updater 320a/320b for updating the internal state values of the lower 8 bits; a 4-bit register 330a/330b for storing an intermediate result generated during generation of a parameter required for updating the internal state values of the lower 8 bits; a 96-bit internal state storing register 340a/340b for storing the internal state values of the upper 24 bits; and a 96-bit internal state updater 350a/350b for updating the internal state values of the upper 24 bits.

The 8-bit internal state updater 320a/320b includes two 8-bit S-box operators 321a and 322a/321b and 322b, a multiplexer 323a/323b, and an 8-bit parameter generator 324a/324b. The two 8-bit S-box operators 321a and 322a/321b and 322b generate values for updating the 8-bit internal state values using the 8-bit internal state values stored in the 32-bit internal state storing register 310a/310b, respectively. The multiplexer 323a/323b selects one of the values output from the two S-box operators 321a and 322a/321b and 322b for updating the 8-bit internal state values. The 8-bit parameter generator 324a/324b generates an 8-bit parameter required for the selection of the multiplexer 323a/323b on the basis of the 8-bit internal state values stored in the 32-bit internal state storing register 310a and 310b.

The 96-bit internal state updater 350a/350b includes two 24-bit S-box operators 351a and 352a/351b and 351b, a multiplexer 353a/353b and a 24-bit parameter generator 354a/354b. The two 24-bit S-box operators 351a and 352a/351b and 352b generate values for updating the 24-bit internal state values using the 24-bit internal state values stored in the 96-bit internal state storing register 340a/340b, respectively. The multiplexer 353a/353b selects one of the values output from the two S-box operators 351a and 352a/351b and 352b for updating the 24-bit internal state values. The 24-bit parameter generator 354a/354b generates a 24-bit parameter required for the selection of the multiplexer 353a/353b on the basis of the 24-bit internal state values stored in the 96-bit internal state storing register 340a/340b and the value stored in the 4-bit register 330a/330b.

The apparatus operates as follows. Each of 4 words representing current internal state of the T-function is divided into the lower 8 bits and the upper 24 bits. The lower 8 bits are stored in the 32-bit internal state storing register 310a/310b, and the upper 24 bits are stored in the 96-bit internal state storing register 340a/340b. To update the internal state of the T-function, an internal state of the lower 8 bits is first updated, and an internal state of the upper 24 bits is then updated using an intermediate result obtained from the 8-bit update process.

The 8-bit S-box operators 321a and 322a/321b and 322b generate values for updating the 8-bit internal state using the 8-bit internal state values stored in the 32-bit internal state storing register 310a/310b, and one of the values is stored as a new 8-bit internal state via the multiplexer 323a/323b. The 8-bit parameter generator 324a/324b generates an 8-bit parameter for selecting the multiplexer 323a/323b using the 8-bit internal state, and stores in the 4-bit register 330a/330b a 4-bit carry, generated due to addition and left shift operations in parameter calculations, to be used for generating a parameter of the upper 24 bits. Update of the internal state of the upper 24 bits is similar to the update of the internal state of the lower 8 bits but must use the carry obtained from the process of generating the parameter of the lower 8 bits to generate the parameter of the upper 24 bits. Thus, the carry is obtained from the 4-bit register 330a/330b to process the computation.

In general, computation of an S-box in a TSC-4 algorithm is performed by a 4×4 read-only memory (ROM) or a multiplexer using Equation 2 below.

$$S[16]=\{9,2,11,15,3,0,14,4,10,13,12,5,6,8,7,1\}$$

$$S^6[16]=\{6,13,8,0,5,12,1,11,4,14,3,10,15,7,2,9\} \quad \text{[Equation 2]}$$

However, the present invention uses Equation 3 below to minimize hardware area and perform an S-box operation at a high speed.

$$S_0=(\overline{x_0}\hat{x_1}\hat{x_3})\oplus(x_0\overline{x_2}x_3)\oplus(x_1\hat{x_2}\hat{x_3})\oplus(x_1\overline{x_2}\hat{x_3})$$

$$S_1=(\overline{x_0}\overline{x_1})\oplus(\overline{x_2}\overline{x_3})\oplus(\overline{x_0}\hat{x_1}\hat{x_2})$$

$$S_2=(\overline{x_2}\hat{x_3})\oplus(\overline{x_0}\overline{x_1}\hat{x_3})\oplus(x_0\hat{x_1}\overline{x_3})\oplus(\overline{x_0}\hat{x_1}\hat{x_2})$$

$$S_3=(\overline{x_0}\overline{x_2})\oplus(x_0\overline{x_1}\hat{x_3})\oplus(x_1\overline{x_2}\overline{x_3})\oplus(\overline{x_0}\hat{x_1}\overline{x_3})$$

$$S_0^6=x_2\oplus(x_0\hat{x_1}\overline{x_3})\oplus(\overline{x_0}\hat{x_1}\hat{x_3})$$

$$S_1^6=x_3\oplus(\overline{x_0}\overline{x_1}\overline{x_2})\oplus(x_0\hat{x_1}\hat{x_2})$$

$$S_2^6=\overline{x_1}$$

$$S_3^6=x_0\oplus(\overline{x_0}\hat{x_2}\hat{x_3})\oplus(x_1\overline{x_2}\overline{x_3}), \quad \text{[Equation 3]}$$

In Equation 3, $S_3$, $S_2$, $S_1$ and $S_0$ are respective bit values of S[16] expressed in 4 bits. Among the values, $S_3$ is the MSB value, and $S_0$ is the LSB value. In addition, $S^6_3$, $S^6_2$, $S^6_1$ and $S^6_0$ are respective bit values of $S^6[16]$ expressed in 4 bits. Among the values, $S^6_3$ is the MSB value, and $S^6_0$ is the LSB value. When four 32-bit words representing the internal state are defined as $\chi_0$, $\chi_1$, $\chi_2$ and $\chi_3$, S[16] and $S^6[16]$ are obtained by Equation 3, and then i-th bits of the respective words are updated using S[16] when a parameter generation result is 1, and $S^6[16]$ when the parameter generation result is 0.

The nonlinear filter 360 separately performs addition of 96-bit internal state values output from the 96-bit internal state storing registers 340a and 340b to generate six pieces of 8 bits, and then generates 8 bits using an Exclusive OR (XOR) operation.

Figure 4:
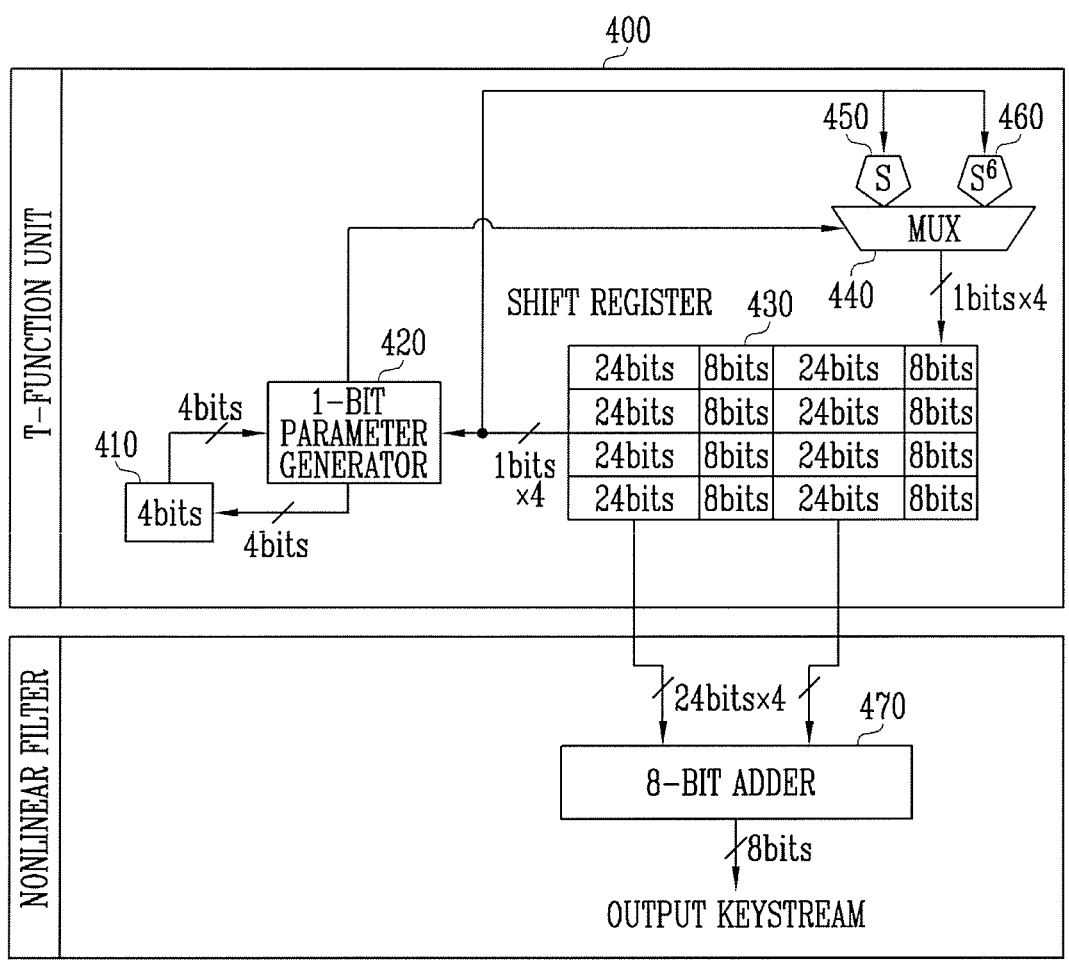
FIG. 4 illustrates a lightweight apparatus for computing a TSC-4 according to a second exemplary embodiment of the present invention.

FIG. 4 is a lightweight apparatus for computing a TSC-4 stream cipher according to a second exemplary embodiment of the present invention. As illustrated, the computation apparatus comprises a T-function unit 400 and a nonlinear filter comprised of an 8-bit adder 470. The T-function unit 400 includes two S-box operators 450 and 460, a multiplexer 440, four 64-bit shift registers 430, a 1-bit parameter generator 420 and a 4-bit register 410. The multiplexer 440 selects one of two values output from the two S-box operators 450 and 460. The four 64-bit shift registers 430 store a current internal state of a T-function and supply a 4-bit LSB value comprised of the LSB values of each register to the 1-bit parameter generator 420 and the S-box operators 450 and 460 for each clock. The 1-bit parameter generator 420 generates a parameter required for the selection of the multiplexer 440 on the basis of the 4-bit LSB value supplied from the four 64-bit shift registers 430. The 4-bit register 410 stores a 4-bit carry obtained from the process of generating the parameter. The 8-bit adder 470 receives 96 bits output from the T-function unit 400 and generates an 8-bit output sequence per clock.

The apparatus for computing a TSC-4 stream cipher updates the 4-bit MSB of the four 64-bit shift registers 430 using 4-bit data output from the S-box operators 450 and 460 for each clock.

Figure 5:
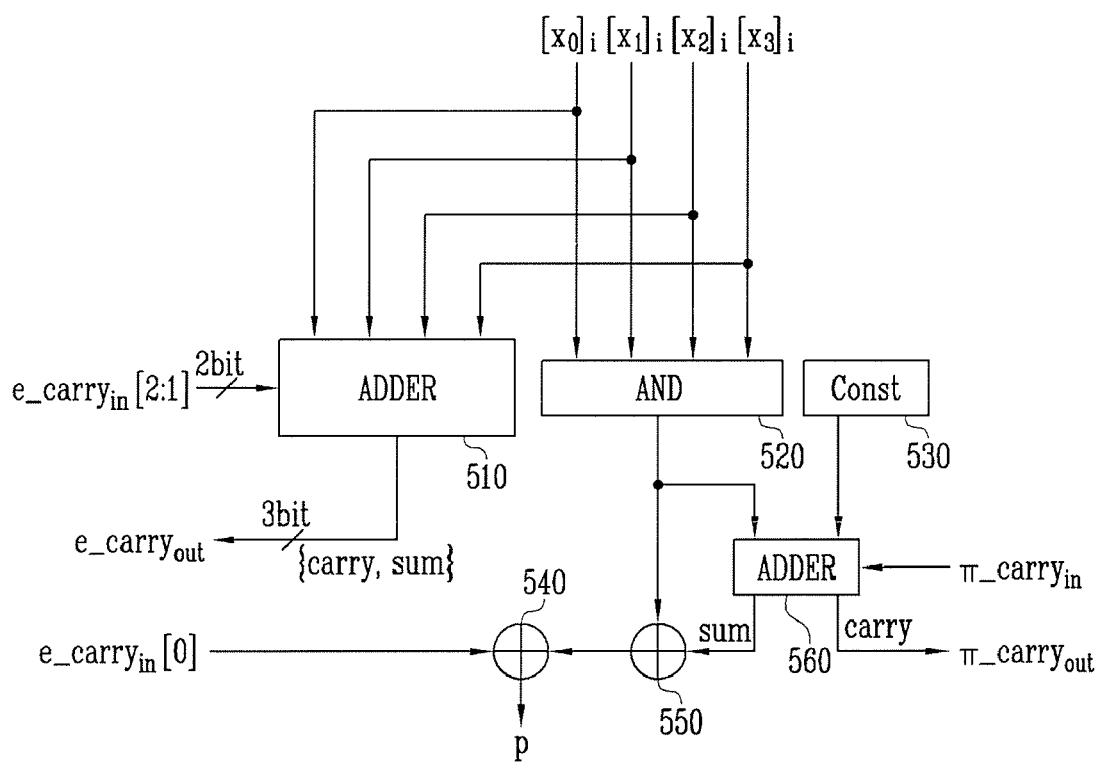
FIG. 5 is a block diagram of a 1-bit parameter generator according to an exemplary embodiment of the present invention.

FIG. 5 is a block diagram of a 1-bit parameter generator applied to an apparatus for computing a TSC-4 stream cipher according to an exemplary embodiment of the present invention. Values of parameters $p_1$ and $p_2$ are generated by Equation 4.

$$\pi(x) = x_0 \wedge x_1 \wedge x_2 \wedge x_3$$

$$o_1(x) = \pi(x) \oplus (\pi(x) + 0x51291089)$$

$$e(x) = (x_0 + x_1 + x_2 + x_3)_{<<1}$$

$$p_1(x) = o_1(x) \oplus e(x)$$

$$\pi(y) = y_0 \wedge y_1 \wedge y_2 \wedge y_3$$

$$o_2(y) = \pi(y) \oplus (\pi(y) + 0x12910895)$$

$$e(y) = (y_0 + y_1 + y_2 + y_3)_{<<1}$$

$$p_2(y) = o_1(y) \oplus e(y) \quad \text{[Equation 4]}$$

The 1-bit parameter generator according to an exemplary embodiment of the present invention receives i-th bits of four 32-bit words $\chi_0, \chi_1, \chi_2$ and $\chi_3$, calculates values $\pi$ and $e$ using an AND operator 520 and an adder 510, generates values $o_1$ and $o_2$ through a constant unit 530, an adder 560 and an XOR operator 550, and finally calculates the 1-bit parameters p1 and p2 using the XOR operator 540. A 1-bit carry is generated in the calculation of the values $o_1$ and $o_2$. A 2-bit carry is generated in the calculation of the value e, and a 1-bit left shift operation is performed, thereby generating a 3-bit carry. Consequently, a 4-bit carry is generated.

The 1-bit parameter generator is applied as is to the lightweight apparatus for computing a TSC-4 stream cipher shown in FIG. 4. In addition, an n-bit parameter generator applied to the apparatus for computing a TSC-4 stream cipher at high speed shown in FIG. 3 may be implemented by parallelizing a plurality of the 1-bit parameter generators. For example, an 8-bit parameter generator may be implemented by connecting eight 1-bit parameter generators in parallel such that a 4-bit carry of a lower parameter generator is input into an upper parameter generator.

As described above, the present invention provides a method of implementing the TSC-4 algorithm in a high-speed computation apparatus and a lightweight computation apparatus. The high-speed TSC-4 computation apparatus is small in size but operates at a high speed, and thus can be used in server-class cryptographic equipment like a Virtual Private Network (VPN). The high-speed implementation takes 16 clocks for initialization and has a speed of 1.8 Gbps or more.

The lightweight TSC-4 computation apparatus can be applied to portable cryptographic equipment, such as a smart card and an electronic passport. The lightweight implementation performs initialization using 520 clocks and may have a size of less than 3500 gates.

In addition, using the stream cipher computation apparatus according to an exemplary embodiment of the present invention in both server-class cryptographic equipment and portable cryptographic equipment, it is possible to build a safe network based on TSC-4, which will help to proliferate the TSC-4 algorithm.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for computing a T-function based Stream Cipher (TSC)-4 comprising two T-function units and a non-linear filter for receiving bits output from the two T-function units and generating an 8-bit output sequence per clock, wherein each of the T-function units comprises:
   a first register for storing an internal state value of lower N bits;
   an N-bit internal state updater for updating the internal state value of the lower N bits stored in the first register;
   an intermediate result register for storing an intermediate result value output from the N-bit internal state updater;
   a second register for storing an internal state value of upper M bits; and
   an M-bit internal state updater for updating the internal state value of the upper M bits stored in the second register using the value stored in the intermediate result register.

2. The apparatus of claim 1, wherein the N-bit internal state updater comprises:
   two N-bit sized S-box operators for generating values for updating the internal state value of the N bits stored in the first register, respectively;
   a first multiplexer for selecting one of the values output from the two N-bit sized S-box operators; and
   an N-bit parameter generator for generating an N-bit parameter required for the selection of the first multiplexer using the value stored in the first register.

3. The apparatus of claim 1, wherein the M-bit internal state updater comprises:
   two M-bit sized S-box operators for generating values for updating the internal state value of the M bits stored in the second register, respectively;
   a second multiplexer for selecting one of the values output from the two M-bit sized S-box operators; and
   an M-bit parameter generator for generating an M-bit parameter required for the selection of the second multiplexer using the value stored in the second register and the value stored in the intermediate result register.

4. The apparatus of claim 1, wherein N is 8, M is 24, and the intermediate result register is a 4-bit register.

5. The apparatus of claim 2, wherein the two N-bit sized S-box operators calculate $S_3, S_2, S_1, S_0$ and $S^6_3, S^6_2, S^6_1, S^6_0$ on the basis of the following equation:

$$S_0 = (\overline{x_0} \wedge \overline{x_1} \wedge x_3) \oplus (x_0 \wedge \overline{x_2} \wedge x_3) \oplus (x_1 \wedge x_2 \wedge x_3) \oplus (x_1 \wedge \overline{x_2} \wedge \overline{x_3})$$

$$S_1 = (\overline{x_0} \wedge \overline{x_1}) \oplus (\overline{x_2} \wedge \overline{x_3}) \oplus (\overline{x_0} \wedge x_1 \wedge x_2)$$

$$S_2 = (\overline{x_2} \wedge x_3) \oplus (\overline{x_0} \wedge \overline{x_1} \wedge x_3) \oplus (x_0 \wedge x_1 \wedge \overline{x_3}) \oplus (\overline{x_0} \wedge x_1 \wedge x_2)$$

$$S_3 = (\overline{x_0 \hat{} x_2}) \oplus (x_0 \hat{} x_1 \hat{} x_3) \oplus (x_1 \hat{} \overline{x_2 \hat{} x_3}) \oplus (\overline{x_0} \hat{} x_1 \overline{x_3})$$

$$S_0^6 = x_2 \oplus (x_0 \hat{} \overline{x_1 \hat{} x_3}) \oplus (\overline{x_0} \hat{} x_1 \hat{} x_3)$$

$$S_1^6 = x_3 \oplus (\overline{x_0 \hat{} x_1 \hat{} x_2}) \oplus (x_0 \hat{} x_1 \hat{} x_2)$$

$$S_2^6 = \overline{x_1}$$

$$S_3^6 = x_0 \oplus (\overline{x_0} \hat{} x_2 \hat{} x_3) \oplus (x_1 \hat{} \overline{x_2 \hat{} x_3}),$$

wherein $S_3$, $S_2$, $S_1$ and $S_0$ are respective bit values of S[16] expressed in 4 bits, $S_3$ is a MSB value, $S_0$ is a LSB value, $S^6_3$, $S^6_2$, $S^6_1$, $S^6_0$ are respective bit values of $S^6$[16] expressed in 4 bits, $S^6_3$ is a MSB value, $S^6_0$ is a LSB value, and $x_0$, $x_1$, $x_2$ and $x_3$ denote N-bit values input into the S-box operators.

6. An apparatus for computing a T-function based Stream Cipher (TSC)-4 comprising a T-function unit and a nonlinear filter for receiving bits output from the T-function unit and generating an 8-bit output sequence per clock, wherein the T-function unit comprises:

a shift register for storing current internal state values of the T-function and outputting a 4-bit LSB value of the current internal state at every clock;

two S-box operators, each of them generating 4-bit data for updating 4-bit MSB value of the shift register using the 4-bit LSB value of the current internal state output from the shift register;

a multiplexer for selecting one of the two 4-bit data output from the two S-box operators for updating the 4-bit MSB value of the shift register; and a 1-bit parameter generator for generating a parameter required for the selection of the multiplexer by one bit using the 4-bit LSB value of the current internal state output from the shift register.

\* \* \* \* \*